United States Patent
De Bree (10) Patent No.: US 8,485,272 B2
(45) Date of Patent: Jul. 16, 2013

(54) SOIL AERATING DEVICE AND METHOD FOR PUSHING PENETRATION TOOLS INTO SOIL

(75) Inventor: Cornelius Hermanus Maria De Bree, Zeist (NL)

(73) Assignee: Redexim Handel-en Exploitatie Maatschappij B.V., AC Zeist (NL)

( * ) Notice: Subject to any disclaimer, the term of this patent is extended or adjusted under 35 U.S.C. 154(b) by 254 days.

(21) Appl. No.: 12/992,056

(22) PCT Filed: May 19, 2009

(86) PCT No.: PCT/EP2009/056067
§ 371 (c)(1),
(2), (4) Date: Nov. 10, 2010

(87) PCT Pub. No.: WO2009/141345
PCT Pub. Date: Nov. 26, 2009

(65) Prior Publication Data
US 2011/0061880 A1    Mar. 17, 2011

(30) Foreign Application Priority Data
May 23, 2008   (EP) .................................... 08156823

(51) Int. Cl.
*A01B 45/02*      (2006.01)
(52) U.S. Cl.
USPC ............................................ 172/21; 172/125
(58) Field of Classification Search
USPC ............................................ 172/21, 22, 125
See application file for complete search history.

(56) References Cited

U.S. PATENT DOCUMENTS

| | | | | |
|---|---|---|---|---|
| 3,022,834 A | * | 2/1962 | Ruka et al. | 172/21 |
| 3,163,235 A | * | 12/1964 | Ray | 172/21 |
| 3,163,236 A | * | 12/1964 | Ray | 172/21 |
| 3,878,899 A | * | 4/1975 | Jones | 172/21 |
| 4,422,510 A | * | 12/1983 | de Ridder | 172/21 |
| 5,709,272 A | * | 1/1998 | Jones et al. | 172/21 |
| 5,810,092 A | * | 9/1998 | Selvatici | 172/94 |
| 6,003,613 A | * | 12/1999 | Reincke | 172/21 |
| 6,199,637 B1 | * | 3/2001 | Wiedenmann | 172/21 |
| 6,561,282 B2 | * | 5/2003 | Smith | 172/21 |

(Continued)

FOREIGN PATENT DOCUMENTS

| | | |
|---|---|---|
| DE | 102005021025 A1 | 10/2006 |
| EP | 0037595 A | 10/1981 |
| EP | 1707041 A | 10/2006 |
| EP | 1852006 A | 11/2007 |

OTHER PUBLICATIONS

International Search Report dated Aug. 28, 2009 in corresponding international patent application No. PCT/EP2009/003397, 2 pages.

*Primary Examiner* — Jamie L McGowan
(74) *Attorney, Agent, or Firm* — Maier & Maier PLLC (57) ABSTRACT

A mobile soil aerating device including a machine frame, a drive, at least one penetration tool hingedly coupled with the machine frame, said penetration tool being adapted to be driven into the soil and to be pulled out again, said penetration tool being pivotable with respect to the machine frame during a penetration phase in which the penetration tool, prior to penetration, being in an initial position at a predetermined penetration angle, and wherein, at least after having pulled the penetration tool from the ground, at least one element engaging the penetration tool and coupled to the machine frame exerts a restoring moment on the penetration tool in order to pivot the penetration tool back to the initial position.

15 Claims, 4 Drawing Sheets

U.S. PATENT DOCUMENTS

| | | | |
|---|---|---|---|
| 8,051,917 B2* | 11/2011 | Wiedenmann | 172/21 |
| 2004/0055768 A1* | 3/2004 | Smith | 172/21 |
| 2005/0178567 A1* | 8/2005 | Wiedenmann | 172/21 |
| 2008/0217034 A1* | 9/2008 | de Bree | 172/21 |
| 2009/0166048 A1* | 7/2009 | Wiedenmann | 172/21 |
| 2009/0200050 A1* | 8/2009 | Bos | 172/21 |
| 2010/0288518 A1* | 11/2010 | Reincke | 172/21 |
| 2010/0294523 A1 | 11/2010 | Wiedenmann | |
| 2011/0005783 A1* | 1/2011 | Livingstone | 172/1 |
| 2011/0042113 A1* | 2/2011 | De Bree | 172/21 |
| 2012/0012351 A1* | 1/2012 | de Bree | 172/21 |

* cited by examiner

SOIL AERATING DEVICE AND METHOD FOR PUSHING PENETRATION TOOLS INTO SOIL

RELATED APPLICATIONS

This application is the U.S. national stage application which claims priority under 35 U.S.C. §371 to International Patent Application No.: PCT/EP2009/056067, filed on May 19, 2009, which claims priority under 35 U.S.C. § 119, to European Patent Application No.: 08156823.0, filed on May 23, 2008, the disclosures of which are incorporated by reference herein their entireties.

The invention is directed to a mobile soil aerating device as defined in the precharacterizing part of claim 1 and a method for pushing penetration tools into soil as defined in the precharacterizing part of claim 14.

Such devices are used to create cavities in soil by means of penetration tools, wherein slot-shaped cavities are formed in the deeper regions of the soil and holes as small as possible are left at the ground surface, even at higher vehicle speeds. The cavities allow a better drainage of water and improve the aeration of the soil, and the loosening of the soil enhances plant growth, especially of grasses.

From European Laid-Open Publication EP-A-0037595, a soil working device is known that uses two support arms guided in a parallelogram-like manner, pivotally supporting a tool holder at one end, while their other end is pivotally supported at the machine frame, respectively. The pushrod of the crank drive is hinged to the tool holder and drives the same such that it moves up and down. One of the two support arms is adjustable in length and includes a stop spring means. As long as the penetration tool is outside the soil, the support arm rests against the stop because of the spring force. With the penetration tool driven into the soil and the soil working device moving forward, the penetration tool with the tool holder is pivoted against the travelling direction and the length-adjustable support is elongated against the spring force.

Presently known soil working devices use spring elements that permanently exert a restoring moment on the penetration tools so that the penetration tools return to their initial position as soon as they are outside the soil. The penetration tool is preferably pulled against a stop by the spring element, said stop defining the initial position. Hereinafter, initial position means the position the at least one penetration tool assumes just before penetration.

Depending on how deep the soil is to be loosened, penetration tools of different lengths are used and/or the soil aerating device is adjusted vertically. Thus, long penetration tools are used for a deep loosening of the soil. However, deep loosening entails the drawback that these long penetration tools, which have a correspondingly greater mass, require the use of spring elements having a higher spring stiffness so that the penetration tools are moved back into the initial position fast enough. Further, the forces exerted by the penetration tool on the soil are increased by the fact the long penetration tool can leave the soil rather late, whereby the restoring spring element is biased stronger. Because of the spring elements having a high spring stiffness, there is an increased risk, especially at higher vehicle speeds, that the penetrations tools, if still in the soil, make slots in the ground surface instead of the desired small holes, This is particularly true for rather soft ground after rainfall or watering. In recent years, soil aerating devices are increasingly driven at high speeds, whereby, however, the centrifugal forces acting on the penetration tools are increased. As a consequence, spring elements of higher spring stiffness have to be used, which, however, make an additional contribution to the forming of slots. If the spring stiffness of the spring element is high, the impact of the penetration tool against the stop is hard, whereby the bearings and the stop may be damaged.

It is therefore an object of the invention to provide a device and a method of the kind described above, wherein the risk of forming slots is reduced also for high vehicle speeds and long penetration tools.

The object is accomplished with the features of claims 1 and 14.

For a soil aerating device of the type described above, the invention advantageously provides that, at least during a part of a phase in which the penetration tool is in the soil, at least one element engaging the tool holder exerts a moment on the penetration tool that is opposite to the restoring moment, said moment being exerted around a first pivot axis.

This is advantageous in that the risk of slot-forming is reduced by the fact that no or at least no strong restoring moment is exerted on the penetration tool as long as the penetration tool is in the ground.

It is another advantage that the penetration tool is assisted in making a tilting movement within the soil, whereby the soil is particularly well loosened.

The element can be driven hydraulically, pneumatically, electromagnetically or mechanically.

Preferably, the mobile soil aerating device comprises:
at least one guide arm moved up and down by the drive and arranged at the machine frame for pivotal movement, said guide arm comprising at least one penetration tool hingedly coupled with the guide arm, said penetration tool being adapted to be driven into the soil and to be pulled out again, and
a tool holder for the penetration tool, which tool holder is supported around a first pivot axis in the guide arm movable up and down by the drive, in order to allow the penetration tool to be pivoted relative to the guide arm during a penetration phase in which the penetration tool is in the soil,
said penetration tool, prior to penetration, being in an initial position at a predetermined penetration angle, and
wherein, at least after having pulled the penetration tool out of the ground, at least one element engaging the tool holder exerts a restoring moment on the penetration tool in order to pivot the penetration tool back to the initial position.

The transitions between the phase in which the element exerts a restoring moment on the penetration tool and the phase in which the element exerts a moment on the penetration tool that is opposite to the restoring moment, are preferably within the penetration phase during which the penetration tool is in the soil. The element does not exert a moment on the penetration tool at the times of phase transition.

The position of the phase transitions within a working cycle, during which the element does not exert a moment on the penetration tool, may be adjustable. Within a working cycle, the penetration tool is pushed into the soil once and is pulled out again.

The duration of the phase in which the element exerts a moment on the penetration tool that is opposite to the restoring moment, can also be adjusted.

This offers the advantage that the durations of the phases in which the element exerts a moment on the penetration tool that is opposite to the restoring moment, and the times of the phase transitions can be adapted to different penetration tools and also to the vertical adjustment of the soil aerating device. With penetration tools of different lengths and upon a vertical adjustment of the soil aerating device, the duration of the penetration phase during which the penetration tool is in the soil differs.

The element may be formed by a force element which, during the phase in which a moment opposite to the restoring moment acts on the penetration tool, exerts a pressure or tensile force on the penetration tool that generates this moment. Preferably, the pressure or tensile force attacks at the tool holder to which the penetration tool is mounted.

As an alternative, the element could also be arranged concentrically about the first pivot axis and directly generate the moment opposite to the restoring moment, which is exerted on the penetration tool in a part of the phase during which the penetration tool is in the soil.

The force element may be formed by a piston/cylinder element coupled with the machine frame and, via the tool holder, with the penetration tool.

The piston/cylinder element may be driven hydraulically, pneumatically, electro-magnetically or mechanically.

The piston/cylinder element may comprise at least one piston and at least one spring element.

The force element may comprise two helical springs. The two helical springs may be provided one behind the other in the direction of force. The two helical springs may be adapted to be biased.

Preferably, a plurality of tool holders for one or a plurality of penetration tools are arranged side by side.

At least one force element may be coupled respectively with a respective one of the tool holders arranged side by side and the machine frame.

The position or the times of the phase transitions within a working cycle, at which a respective force element exerts no moment on a respective penetration tool, can be adjusted centrally for all of the force elements arranged side by side.

The biases of the helical springs of the force elements arranged side by side may be adjusted centrally.

The helical springs may be guided within the piston/cylinder element.

The force element may be hingedly supported at the tool holder in a first pivot hinge, on the one hand, and at the machine frame in a second pivot hinge, on the other hand.

The force element may be hingedly supported at the tool holder in a first pivot hinge, on the one hand, and at a pivot arm in a third pivot hinge, on the other hand, said pivot arm itself being hingedly supported at the machine frame.

The times of phase transition within a working cycle, at which the force element exerts no moment on the penetration tool, may be adjusted by pivoting the pivot arm relative to the machine frame.

The bias of the helical springs may be adjusted by pivoting the pivot arm relative to the machine frame.

In the vicinity of the lower dead center of the penetration tool, the force of the force element exerting a moment on the penetration tool that is opposite to the restoring moment, may reach a maximum, and in that in the vicinity of the upper dead center of the penetration tool, the force of the force element generating the restoring moment, may reach a maximum.

The second or the third pivot hinge, respectively, in which the force element is hingedly supported at the machine frame or the pivot arm, may be arranged between a plane parallel to the soil surface and extending through the upper dead center of the first pivot hinge, in which the force element is hingedly supported at the tool holder, and a plane parallel to the soil surface and extending through the lower dead center of the first pivot hinge.

Hereinafter, embodiments of the invention will be explained with reference to the drawings.

Figure 1:
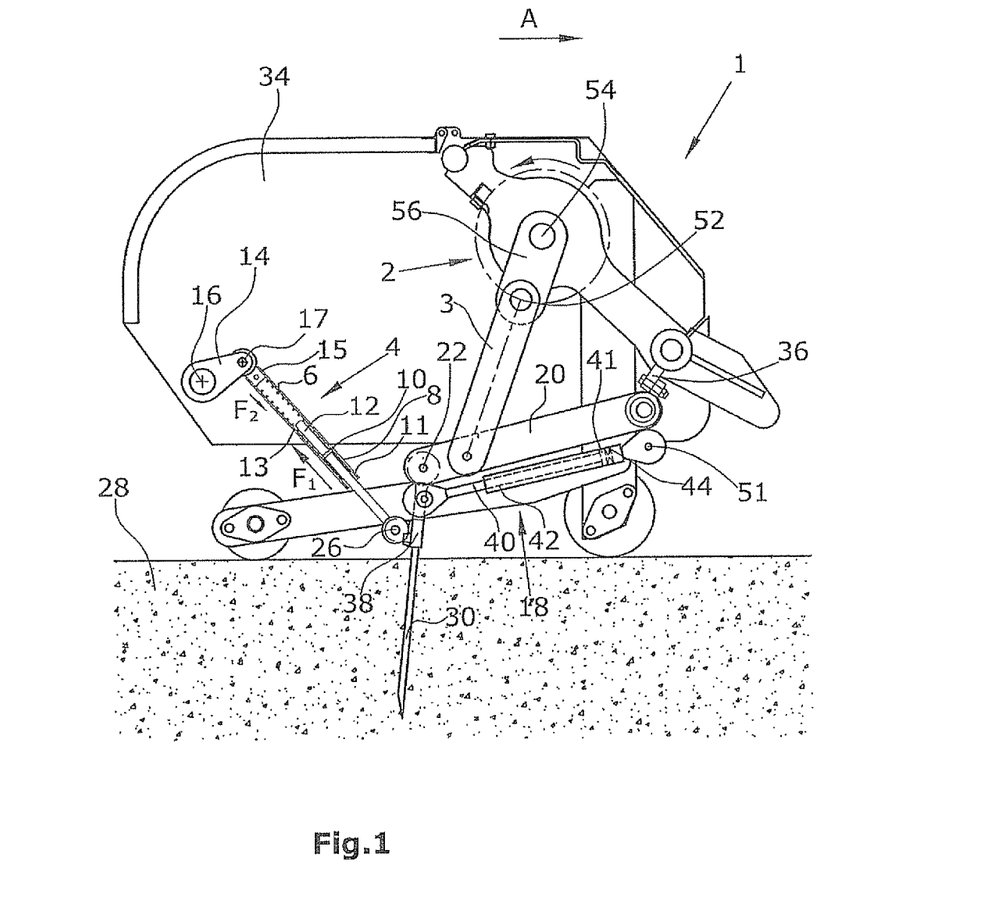
FIG. 1 a side elevational view of a soil aerating device with a penetration tool pushed into the soil, FIG. 2 a side elevational view of the embodiment of FIG. 1, the penetration tool being at the upper dead center, FIG. 3 a side elevational view of another embodiment with the penetration tool pushed into the ground, and FIG. 4 a side elevational view of the embodiment of FIG. 3 with the penetration tool at the upper dead center.

FIG. 1 is a side elevational view of a mobile soil aerating device 1 that may be self-propelled or may be pulled by a drawing vehicle. The soil aerating device 1 has a machine frame 36 at which a plurality of guide arms 20 are pivotably hinged side by side. The guide arms 20 each extend in a plane extending in the travelling direction A and orthogonal to the soil surface. For the sake of clarity, only one guide arm is illustrated in FIG. 1. Driven by a pushrod 3 of a crank drive 2, the guide arm 20 exerts an up and down movement. The crank drive 2 has a crankshaft besides the pushrods 3. The crankshaft comprises crankpins 52, crankshaft journals 54 and webs 56 connecting the crankpins 52 to the crankshaft journals 54. The crankshaft journals 54 represent the rotational axis of the crankshaft. The crankpins 52 receive the pushrod 3 and, in operation, describe an orbit around the rotational axis of the crankshaft. As an alternative to the crank drive 2, the guide arm 20 may also be driven hydraulically or electrically.

At the end of the guide arm 20 remote from the machine frame 36, a tool holder 38 is hinged at the guide arm 20 in a pivot hinge 21 for pivotal movement about a first pivot axis 22. At least one penetration tool 30 is fastened to the tool holder 38 either individually or as a set of a plurality of tools. Together with the tool holder 38, the penetration tool 30 or the set of penetration tools 30 is adapted to be pivoted about the first pivot axis 22 with respect to the guide arm 20. Further, driven by the crank drive 2, the penetration tools 30 and the tool holder 38, together with the guide arm 20, perform an up and down movement. Due to the up and down movement, the penetration tools 30 are pushed into the soil 28 and are pulled out during a working cycle. In one working cycle, the crankpin 52 rotates once for 360° around the crankshaft journal 54. The working cycle includes a penetration phase in which the penetration tool 30 is in the soil 28, and at least one phase in which the penetration tool 30 is outside the soil 28.

A plurality of penetration tools 30, preferably arranged side by side, or juxtaposed sets of penetration tools 30 can be driven via a respective guide arm 20. The guide arms 20 arranged side by side are driven in a uniformly phase-shifted manner via different juxtaposed crankpins 52 of the crank drive.

Further, a piston/cylinder element 4 is pivotably hinged in a first pivot hinge 26 at the tool holder 38. At the other end, the piston/cylinder element 4 is pivotably hinged in a third pivot hinge 17 at a pivot arm 14. With respect to the guide arm 20, the piston/cylinder element 4 is arranged on the opposite side of a plane extending through the first pivot axis 22 and orthogonal to the soil surface. Both the pivot arm 14 and the piston/cylinder element 4 extend in a plane extending in the travelling direction A and orthogonal to the soil surface. The pivot arm 14 is fastened to an axis 16. The axis 16 extends parallel to the soil surface and orthogonal to the travelling direction A. At its ends, the axis 16 may be supported in the walls 34 of the machine frame 36, for example. The axis 16 may be pivoted with respect to the machine frame 36, whereby the pivot arm 14 with the pivot hinge 17 is pivoted relative to the machine frame 36. The axis 16 can be held at defined pivot positions, where the axis 16 is held in a manner secured against rotation with respect to the machine frame 36. When the axis 16 is locked in a locking position, the pivot arm 14 is also stationary with respect to the machine frame 36. The axis 16 may also be adjusted in the horizontal and the vertical direction.

Figure 2:
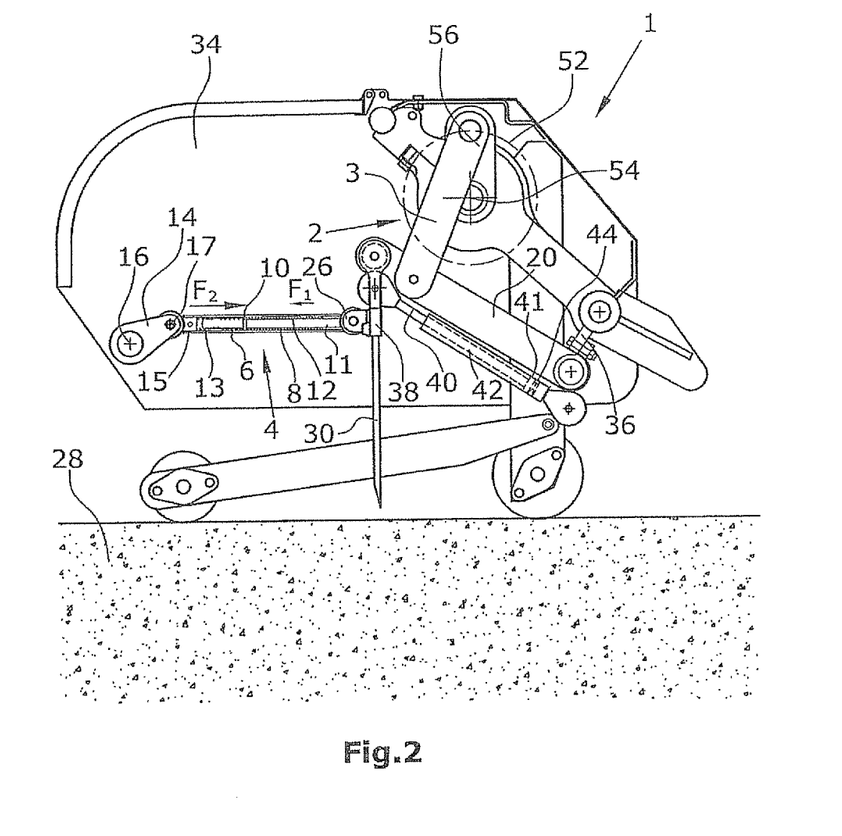

The piston/cylinder element 4 illustrated in FIGS. 1 and 2 comprises a cylinder 13, a piston rod 12 and two helical springs 6, 8. The two helical springs 6, 8 are positioned one behind the other in the direction of the force generated by the helical springs 6, 8. The two helical springs 6, 8 are arranged within the cylinder 13. Both helical springs 6, 8 are separated by the annular disc 10 of the piston rod 12. The helical spring 6 is unfixedly arranged between the first end 15 of the cylinder 13 and the annular disc 10 of the piston 12. The first end 15 of the cylinder 13 is hinged in the third pivot hinge 17 at the pivot arm 14. The helical spring 8 is unfixedly arranged between the side of the annular disc 10 of the piston rod 12 opposite the helical spring 6 and the second end 11 of the cylinder 13. The two helical springs 6, 8 are compression springs. The second end 11 of the cylinder 13 may be attached or removed by screwing. The piston rod 12 is at least partly guided within the cylinder 13 and the helical springs 6, 8. The piston rod 12 passes through a bore provided in the end 11 of the cylinder 13. The piston rod 12 is movable with respect to the cylinder 13. The end of the piston rod 12 outside the cylinder 13 is pivotably hinged in the first pivot hinge 26 at the tool holder 38. The piston/cylinder unit may also be arranged inversely, i.e. the end 15 of the cylinder 13 is hinged to the tool holder 38 and the end of the piston 12 outside the cylinder 13 is hinged to the pivot arm 14.

Due to the up and down movement of the guide arm 20, the penetration tool 30 is pushed into the soil 28 and pulled out again. At least after the penetration tool 30 has been pulled out from the soil, the piston/cylinder element 4 exerts a restoring moment on the penetration tool 30 in order to pivot the penetration tool 30 back into the initial position.

During the phase in which the penetration tool 30 is outside the soil, the helical spring 6 generates a force $F_2$ and the helical spring 8 generates a force $F_1$, the force $F_2$ being substantially greater than the force $F_1$, see FIG. 2. Both helical springs 6, 8 cause a pressure force to be exerted on the tool holder at least during the phase in which the penetration tool 30 is outside the soil. This pressure force generates the restoring moment. During the phase in which a restoring moment is exerted on the penetration tool, the force $F_2$ of the helical spring 8 could also be zero.

The helical springs 6, 8 of the piston/cylinder element 4 together exert a restoring moment on the tool holder 38 at least until the penetration tool 30 has been pushed into the soil.

The initial position is defined by the stop element 18. The stop element 18 hingedly fastened to the tool holder 38 and is attached, on the other hand, to the machine frame 36 via a pivot hinge 51. The pivot hinge 51 can be pivoted relative to the machine frame 36 to adjust the stop position, wherein, preferably, all pivot hinges 51 associated to the respective guide arms 20 may be adjusted together through a single adjustment means. The stop element 18 is formed by a piston rod 40, a cylinder 42 and a stop 44. The piston rod 40 is at least partly guided within the cylinder 42 and has a piston 41 provided at the end situated in the cylinder 42. When the penetration tool 30 is pivoted back, the piston 41 of the piston rod 40 is pressed against the stop 44, whereby the return pivot movement of the penetration tool 30 is limited. This position is called the initial position. As long as the piston 41 abuts on the stop 44, the penetration tool 30 is in the initial position. It is obvious that other adjustable stop elements can also be used, such as those that are supported at the guide arm 20, for example.

Alternatively, the helical spring 6 could also be arranged in the cylinder 42 of the stop element 18, with the force of the helical spring 6 again having the effect that at least during the phase in which the penetration tool 30 is without the soil 28, a restoring moment is exerted on the tool holder 38. In this case, the piston/cylinder element 4 would include only the helical spring 8.

The initial position is the angular orientation at which the respective penetration tool 30 is pushed into the soil 28. During the penetration phase in which the penetration tool 30 is in the soil 28, the penetration tool 30 is pivoted about the first pivot axis 22 relative to the guide arm 20. This is achieved by the soil aerating device 1 moving forward while the penetration tool 30 is in the soil 28 and by the piston/cylinder element 4 exerting a moment, opposite to the restoring moment, on the tool holder 38 at least for a part of the phase in which the penetration tool 30 is in the soil 28.

During the phase in which the piston/cylinder element 4 exerts a moment, opposite to the restoring moment, on the tool holder 38, the helical spring 6 generates a force $F_2$, and the helical spring 8 generates a force $F_1$, the force $F_1$ being substantially greater than the force $F_2$. Together, the two helical springs 6, 8, which are compression springs in the present embodiment, cause a tensile force to be exerted on the piston 10 of the piston rod 12 and thus on the tool holder 38, said force generating the moment that is opposite to the restoring moment. The force $F_2$ of the helical spring 6 may be zero during the phase in which the piston/cylinder element 4 exerts a moment on the tool holder 38 that is opposite to the restoring moment.

During the phase in which the piston/cylinder element 4 exerts a restoring moment on the penetration tool 30, the helical spring 6 acts as a compression spring and the helical spring 8 acts as a tension spring. The two helical springs 6, 8 cause a pressure force to be exerted on the tool holder 38 during the phase in which the piston/cylinder element 4 exerts a restoring moment on the penetration tool 30. This pressure force generates the restoring moment about the pivot axis 22.

During a working cycle, in which the crankpin 52 of the crank drive 2 has rotated through 360°, two phase transitions exist between the phase in which the piston/cylinder element 4 exerts a restoring moment on the penetration tool 30 and the phase in which the piston/cylinder element 4 exerts a moment on the penetration tool 30 that is opposite to the restoring moment. These two phase transitions, where no moment is exerted on the penetration tool 30, are at the beginning and at the end of the penetrations phase, respectively. At the beginning and at the end of the penetration phase means just after the penetration tool 30 has been pushed into the soil and just before the penetration tool 30 is pulled out again. Thus, the penetration tool 30 is at least partly in the soil 28 during the phase transitions. During these phase transitions, the piston/cylinder element 4 exerts no moment on the penetration tool 30 since the helical springs 6, 8 are in a state of balance.

The position or the times of the phase transitions within a working cycle, in which the piston/cylinder element 4 exerts no moment on the penetration tool 30, are adjustable. As the position or time, a certain time within the working cycle of the crank drive 2 is defined, at which the crankpin 52 assumes a certain angular position. Altering the position or the time means altering the angular position at which the phase transitions occur, relative to the crank drive.

The positions or the times of the phase transitions in which the piston/cylinder element 4 exerts no moment on the penetration tool 30, can be adjusted by pivoting the pivot arm 14 with the axis 16. By pivoting the pivot arm 14, the distance between the pivot hinge 17 and the pivot hinge 26 is changed, Thereby, the position of the piston 10 of the piston rod 12 relative to the cylinder 13 is changed. Thus, the spring travel of the helical springs 6, 8 is changed and the helical springs 6, 8 are biased differently. The helical springs 6, 8 are then in a state of balance at a different time during a working cycle. The duration of the phase in which the piston/cylinder element 4 exerts a moment opposite to the restoring moment on the penetration tool 30, may also be set.

Figure 3:
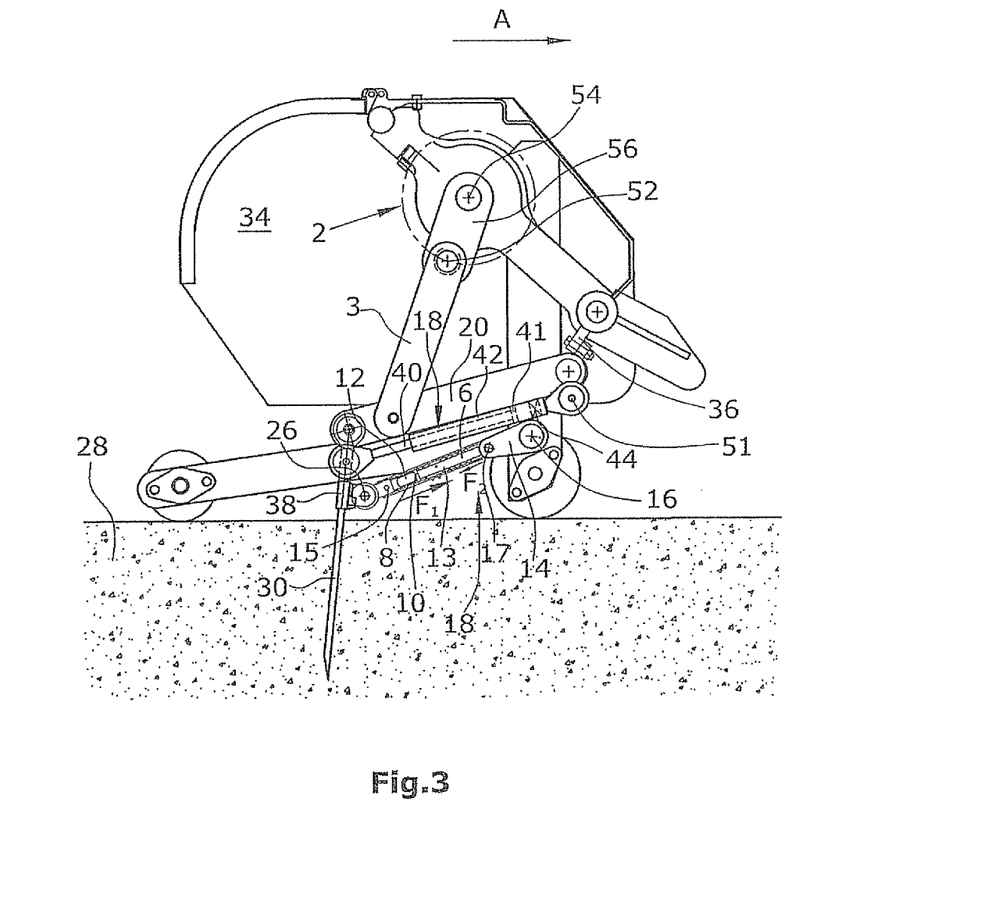
Figure 4:
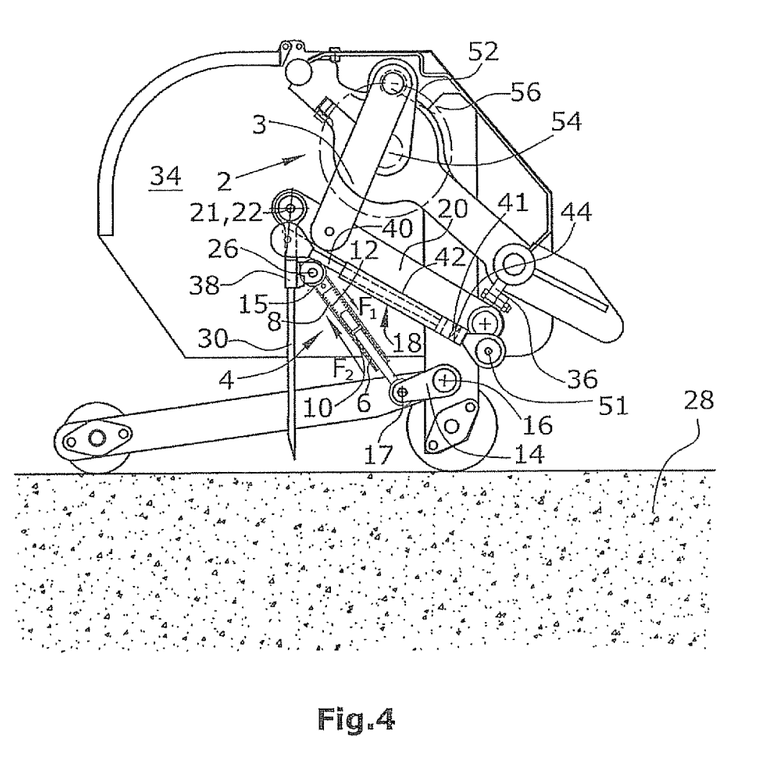

FIGS. 3 and 4 illustrate an alternative embodiment. In this example, the piston/cylinder element 4 is situated, with respect to the guide arm 20, on the same side of the plane extending through the first pivot axis 22 and orthogonally to the soil surface. As a consequence, the piston/cylinder element 4, by the end 15 of the cylinder 13, is pivotably hinged in the first pivot hinge 26 at the tool holder 38, and the piston/cylinder element 4 has the end of the piston rod 12 that is located outside the cylinder 13 pivotably supported in a third pivot hinge 17 at a pivot arm 14. The pivot arm 14 is fastened to the axis 16, As mentioned before, the axis 16 runs parallel to the soil surface and orthogonally to the travelling direction A and is coupled to the machine frame 36. The pivot arm 14 may be pivoted with the axis 16 relative to the machine frame 36. The helical springs 6, 8 are interchanged with respect to the embodiment in FIGS. 1 and 2. i.e., the helical spring 8 is arranged between the end 15 of the cylinder 13 and the annular disk 10 of the piston 12, and the helical spring 6 is located between the annular disc 10 and the end 11 of the cylinder 12.

In the penetration phase, illustrated in FIG. 3, the piston/cylinder element 4 exerts a pressure force on the tool holder 38 that generates the moment on the penetration tool 30 that is opposite to the restoring moment. Both helical springs 6, 8 act as compression springs. During the phase in which the moment opposite to the restoring moment is exerted on the penetration tool 30, the force $F_1$ of the helical spring 8 is greater than the force $F_2$ of the helical spring 6. Thus, the helical springs 6, 8 cause a pressure force to be exerted on the tool holder 38 that generates the moment opposite to the restoring moment on the penetration tool 30.

During the phase in which the penetration tool 30 is outside the soil 28, as illustrated in FIG. 4, the piston/cylinder element 4 exerts a tensile force on the tool holder 38 that generates the restoring moment acting on the penetration tool 30. The force $F_2$ of the helical spring 6 is greater than the force $F_1$ of the helical spring 8.

It is also possible to provide each guide arm 20 with both a piston/cylinder element 4 of FIG. 1 and a second piston/cylinder element 4 of FIG. 4, whose forces and moments add to each other.

Further, it is possible to use a piston/cylinder element 4 of FIG. 1 or FIG. 4 in combination with a spring damper element as is known from prior art, which exerts a restoring moment on the penetration tool during the entire working cycle.

The invention claimed is:

1. A mobile soil aerating device comprising:
  a machine frame,
  a drive,
  at least one penetration tool moved up and down by the drive and being hingedly coupled with the machine frame, the penetration tool being adapted to be driven into the soil and to be pulled out again,
  the penetration tool being pivotable with respect to the machine frame during a penetration phase in which the penetration tool is in the soil,
  the penetration tool, prior to penetration, being in an initial position at a predetermined penetration angle, wherein the initial position is defined by a stop element, and
  wherein, at least after having pulled the penetration tool from the ground, at least one element engaging the penetration tool and coupled to the machine frame exerts a restoring moment on the penetration tool in order to pivot the penetration tool back to the initial position,
  wherein during the phase in which the penetration tool is pulled out from the soil only a restoring moment is exerted on the penetration tool,
  wherein, during the phase in which the penetration tool is in the soil, the at least one element engaging the penetration tool exerts a moment on the penetration tool that is opposite to the restoring moment.

2. The soil aerating device of claim 1, comprising:
  at least one guide arm moved up and down by the drive and arranged at the machine frame for pivotal movement, said guide arm further comprising at least one penetration tool hingedly coupled with the guide arm, the penetration tool being adapted to be driven into the soil and to be pulled out again, and
  a tool holder for the penetration tool, which tool holder is supported around a first pivot axis in the guide arm movable up and down by the drive, in order to allow the penetration tool to be pivoted relative to the guide arm during a penetration phase in which the penetration tool is in the soil,
  the penetration tool, prior to penetration, being in an initial position at a predetermined penetration angle, and
  wherein, at least after having pulled the penetration tool from the ground, at least one element engaging the tool holder exerts a restoring moment on the penetration tool in order to pivot the penetration tool back to the initial position.

3. The soil aerating device of claim 1 wherein the transitions between the phase in which the element exerts a restoring moment on the penetration tool and the phase in which the element exerts a moment on the penetration tool that is opposite to the restoring moment, are within the penetration phase, and in that the element does not exert a moment on the penetration tool at the times of phase transition in a working cycle.

4. The soil aerating device of claim 1, wherein the times of phase transition, at which the element does not exert a moment on the penetration tool, are adjustable.

5. The soil aerating device of claim 1, wherein the duration of the phase in which the element exerts a moment on the penetration tool that is opposite to the restoring moment, are adjustable.

6. The soil aerating device of claim 1, wherein the element can be driven by at least one of hydraulics, pneumatics, electromagnetics or mechanics.

7. The soil aerating device of claim 1, wherein the element is formed by a force element which, during the phase in which a moment opposite to the restoring moment acts on the penetration tool, exerts a pressure or tensile force on the penetration tool that generates said moment.

8. The soil aerating device of claim 1, wherein the force element is formed by a piston and cylinder element coupled with the penetration tool and the machine frame.

9. The soil aerating device of claim 8, wherein the piston and cylinder element comprises at least one piston and at least one spring element.

10. The soil aerating device of claim 7, wherein the force element is formed by two helical springs.

11. The soil aerating device of claim 10, wherein the two helical springs are provided in series.

12. The soil aerating device of claim 10, wherein the two helical springs may be biased.

13. The soil aerating device of claim 7, wherein the times of phase transition, at which the force element exerts no moment on the penetration tool, can be adjusted by pivoting a pivot arm relative to the machine frame.

14. The soil aerating device of claim 13, wherein the bias of the helical springs can be adjusted by pivoting the pivot arm relative to the machine frame.

15. A method for pushing penetration tools of a soil aerating device into the soil, comprising:

moving at least one penetration tool hingedly coupled to the soil aerating device up and down, the penetration tool being pushed into the soil and pulled out again, the penetration tool being pivoted relative to the guide arm during a penetration phase in which the penetration tool is within the soil, the penetration tool being moved, prior to penetrating, to an initial position at a predetermined penetration angle, wherein the initial position is defined by a stop element, and at least after the penetration tool has been pulled from the soil, a restoring moment being exerted on the penetration tool in order to pivot the penetration tool back to its initial position, wherein during the phase in which the penetration tool is pulled out from the soil only a restoring moment is exerted on the penetration tool, and wherein during the phase in which the penetration tool is in the soil, a moment is exerted on the penetration tool that is opposite to the restoring moment.

* * * * *